United States Patent [19]

Lago

[11] Patent Number: 5,228,557
[45] Date of Patent: Jul. 20, 1993

[54] CHAIN CONVEYOR WITH IMPROVED DRIVE DEVICE

[75] Inventor: Leopoldo Lago, Padua, Italy
[73] Assignee: Tecno Pool S.p.A., Padua, Italy
[21] Appl. No.: 964,441
[22] Filed: Oct. 21, 1992
[30] Foreign Application Priority Data Nov. 27, 1991 [IT] Italy .................. M191 A 003164

[51] Int. Cl.⁵ .............................................. B65G 21/18
[52] U.S. Cl. ................... 198/778; 198/834;
198/822; 99/443 C; 62/381
[58] Field of Search ............... 198/778, 831, 834, 822,
198/850-852; 99/443 C; 62/381

[56] References Cited

U.S. PATENT DOCUMENTS

| | | | |
|---|---|---|---|
| 3,319,778 | 5/1967 | Bessant | 198/834 |
| 3,682,295 | 8/1972 | Roinestad | 198/831 |
| 3,834,408 | 9/1974 | Thalacker | |
| 3,854,574 | 12/1974 | Theijsmeijer et al. | 198/834 |
| 4,040,302 | 8/1977 | Katarao | |
| 4,244,464 | 1/1981 | van Capelleveen | 198/831 |
| 4,529,218 | 4/1986 | Park et al. | 198/834 |
| 4,848,537 | 7/1989 | Richards et al. | 198/778 |
| 5,010,808 | 4/1991 | Lanham | 198/778 |

FOREIGN PATENT DOCUMENTS 765760 1/1957 United Kingdom .
1495206 12/1977 United Kingdom .

*Primary Examiner*—Joseph E. Valenza
*Attorney, Agent, or Firm*—Young & Thompson

[57] ABSTRACT

Chain conveyor (11) with a drive device (16) comprising a toothed wheel (39) designed to engage with a chain (18) of the chain belt in a conveyor system (10) and the toothed wheel (39) is arranged so as to be coplanar and between the lateral chains (18, 19) of the belt, underneath the plane defined by the cross bars (20) connecting the chains (18, 19).

10 Claims, 4 Drawing Sheets

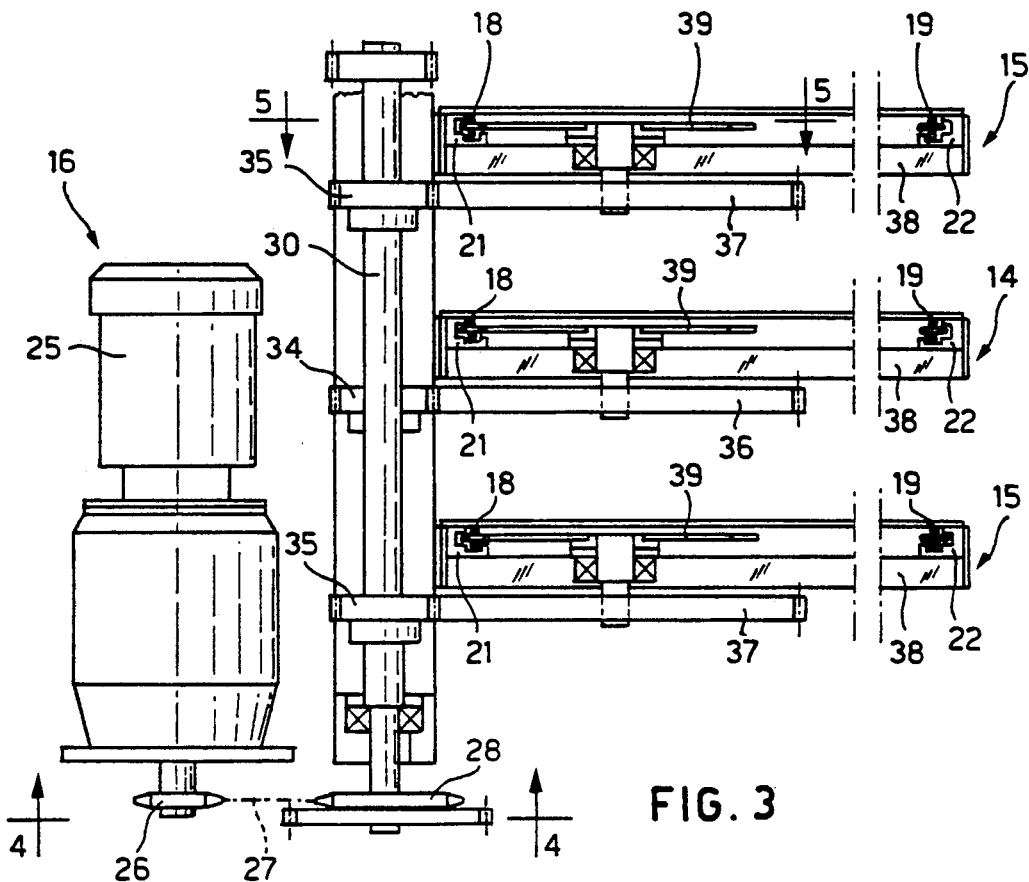
FIG. 3
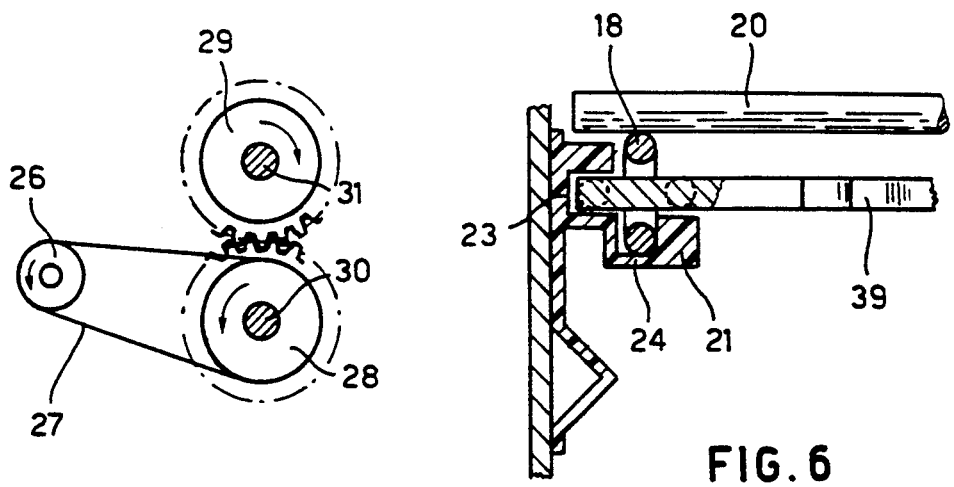
FIG. 4
FIG. 6

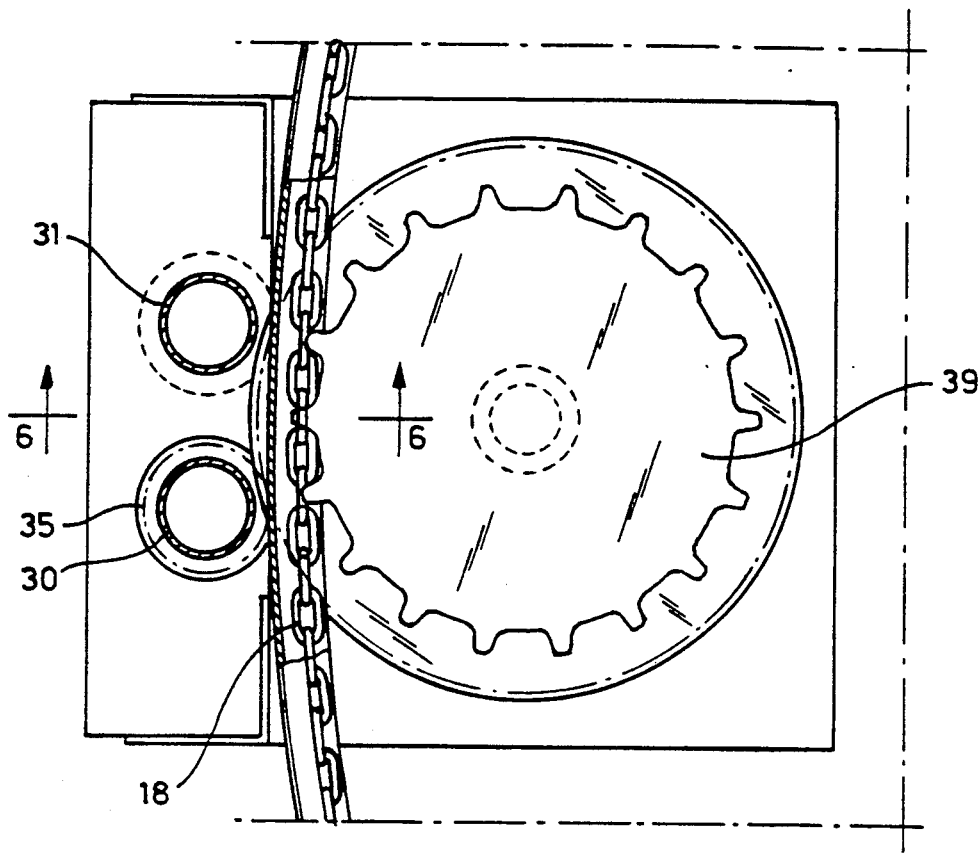
FIG. 5
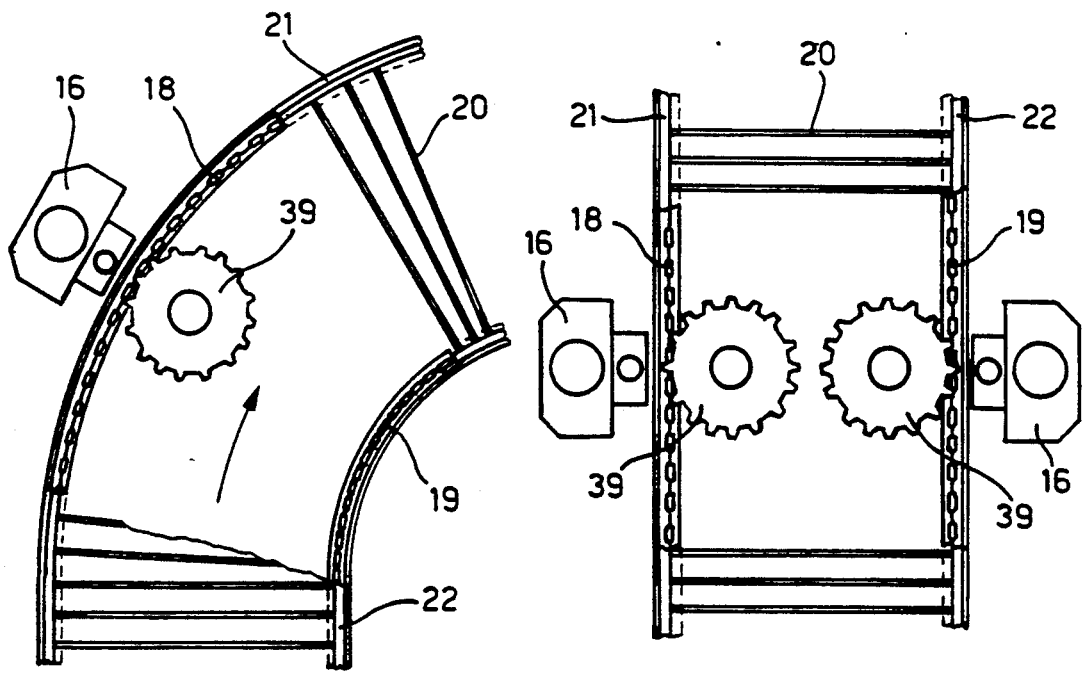
FIG. 7
FIG. 8

CHAIN CONVEYOR WITH IMPROVED DRIVE DEVICE

BACKGROUND OF THE INVENTION

The present invention relates to a chain conveyor of the type comprising a first and a second link chains sliding within guides, in which the annular elements of a chain are connected to corresponding annular elements of the other chain by cross bars, and in particular is concerned with improvements to the devices for entraining or driving the chain belts of the abovementioned conveyor.

Chain conveying systems are known for example from DE-U-8623146, EP-A-274751 and EP-A-275562. Conveying systems of this kind have proved to be particularly useful in many sectors on account of their versatility of use and the significant constructional simplification of these conveyors compared to other conventional conveying systems.

In particular, a chain conveyor comprises a first and a second endless chains formed by interlinked annular elements slidable in respective longitudinal channel guides defining the path of the conveyor; the annular elements of a chain are connected to corresponding annular elements of the other chain by means of cross bars which define the surface of the conveyor belt.

In chain conveyors of the abovementioned kind, the belt is entrained and moved by means of drive units each comprising sprockets or toothed wheels engaging with one or both of the chains of the belt, to cause them to move forward at the desired speed.

The toothed wheels generally engage tangentially and underneath the chain, being arranged in a vertical plane passing through the chain itself.

Such entrainment systems involve considerable drawbacks and limitations as regards use of the conveyor, associated mainly with the small dimensions and arrangement of the toothed wheels which do not allow uniform entrainment.

In fact, the vertical disposition of the toothed wheels and tangential engagement of the latter with the chains causes a continuous up-down movement raising and lowering the chains in the region of each driving unit, which is damaging for many reasons. In particular, the frequent raising and lowering movement of the chains, in addition to producing a considerable amount of noise, gives rise to vibrations over the entire belt, vibrations which may be damaging in the case where the conveyor is used for example to convey baking products inside leavening chambers.

In order to oppose the raising and lowering movement of the chains and limit the vibrations of the belt, usually it is necessary to use guide rails which oppose raising of the chains in the region of each drive unit. This results in a substantial power loss owing to the significant amount of friction produced by the chains rubbing against the guide rails; it has been noted, in fact, that about 50% of the power used in each driving unit is normally lost owing to rubbing of the chains against the channel guide of the conveyor belt.

In many application sectors, in particular in the confectionery and bakery industries, there is also the need to use multiple turns conveyors where the conveyor belt extends in the manner of superimposed turns, for example for the purpose of conveying and transporting the product inside a leavening or freezing chamber, or in order to cool the product to ambient temperature after it has left the oven.

Normally the drive units are positioned in rectilinear zones of the belt so as to allow correct meshing with both chains, by the toothed wheels. For reasons of dimensions, circular turns are also required, which giving rise to the need for a drive unit performing the entrainment at the entry point since there are no straight sections available. In such a case, a single toothed wheel is used on the outer side chain of the belt.

In all cases there is a need for the longest possible conveying path in keeping with the volume of the chamber in which the conveyor is installed or working environment in which a similar conveyor is located.

It would therefore be desirable to arrange the multiple runs of the conveyor in superimoposed planes located very close to one another, so as to limit the height dimensions and consequently the volumes of the leavening or freezing chamber, namely to achieve longer conveying paths for the same conveyor dimensions.

There is, however, a limit as to the amount by which the space between the turns or runs of conventional chain conveyors can be reduced, owing to the dimensions imposed by the toothed entrainment wheels which are provided between adjacent turns of the belt. Reducing the diameters of the entrainment wheels so as to be able to bring the planes of the conveyor turns closer together is in practice not possible since it would result in further irregularities in feeding of the belt which are unacceptable for the intended applications; furthermore, the minimum dimensions of the toothed wheels are bound by the dimensions of the chain link.

A first object of the present invention is to provide a chain conveyor of the kind mentioned, above provided with an improved drive unit to be applied to any type of chain conveyor independently of the path followed by the conveyor belt, by means of which the raising and lowering movement of the belt is totally eliminated, with consequent elimination or reduction in the noise and vibrations to which conventional chain conveyors are usually subject. In this way a chain conveyor is obtained, which is provided with a belt entrainment device able to ensure a high degree of regularity of movement.

A further object of the present invention is to provide a chain conveyor having an improved drive device for the chain belt by means of which it is possible to exploit most of the power supplied by the motor for driving the belt, after substantially eliminating many of the causes of friction, at speeds even greater than those of conventional conveyor belts owing to the possibility of using toothed wheels of larger diameters, without substantially increasing the overall dimensions of the conveyor, but on the contrary reducing them.

A further object of the present invention is to provide a chain conveyor of the kind mentioned above, in particular a multiple runs conveyor, provided with a drive device by means of which it is possible to substantially reduce the space between turns compared to a conventional conveyor.

Yet another object of the present invention is to provide a drive device for chain conveyors, as referred to above, by means of which it is possible to provide circular or curved paths which, for belts having the same width, have comparatively smaller radii of curvature or, for the same radius of curvature, may permit belts having greater widths.

Yet another object of the invention is to provide a drive device such as to allow lateral extension of the cross bars connecting the chains of the conveyor belt, beyond the chains and guides, thus enabling chain belt conveyors with different belt widths to be constructed, independently of the space between the guides for the chains of the same belt.

These and other objects of the invention can be achieved in chain conveyors comprising drive devices according to claim 1 which is characterised by a special arrangement of the entrainment toothed wheels in each drive unit, namely by a particular embodiment and/or disposition of the drive device itself.

BRIEF DESCRIPTION OF THE DRAWINGS

The invention, in some of its preferential embodiments, will be illustrated in greater detail below with reference to the figures of the accompanying drawings, in which:

FIG. 3 is an enlarged detail of the drive device along the line 3—3 of FIG. 2;

FIG. 4 shows, in schematic form, the mechanical transmission of the shafts driving the toothed wheels entraining the various turns of the conveyor;

FIG. 5 is an enlarged view along the line 5—5 of FIG. 3, with some of the parts removed;

FIG. 6 is a section along the line 6—6 of FIG. 5, in the region of the outer side chain of the conveyor;

FIGS. 7 and 8 show possible arrangements of the drive device according to the invention, along a curved section and straight section, respectively, of a chain conveyor;

DESCRIPTION OF THE INVENTION

Figure 1:
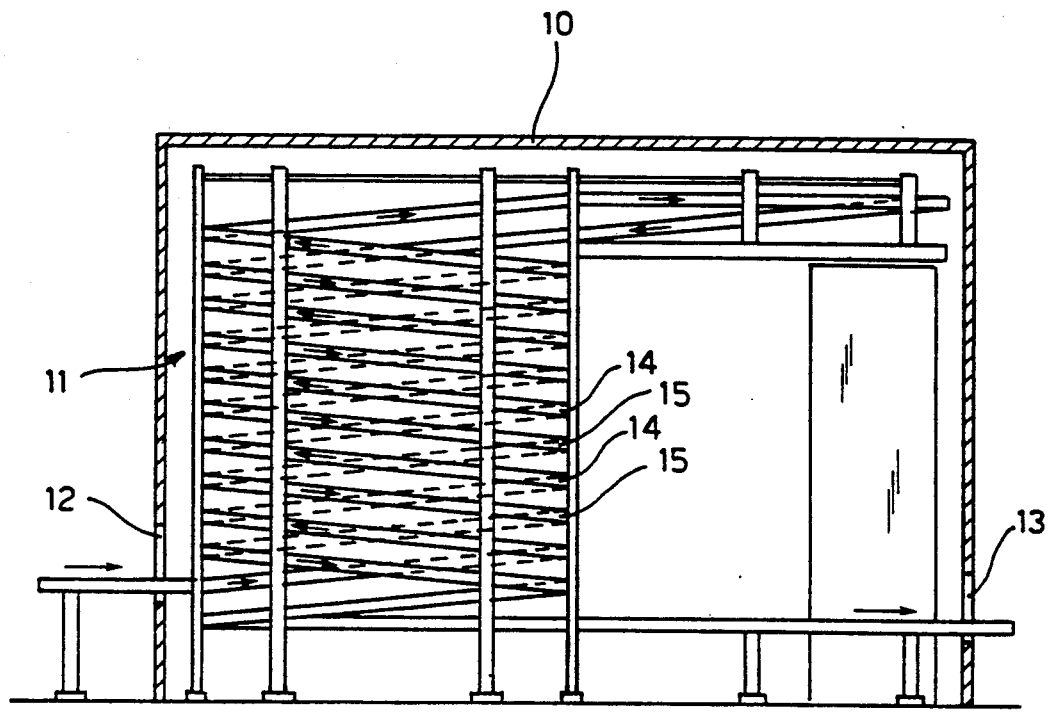
FIG. 1 is a sectioned view of a leavening chamber utilisable in the bakery or confectionery industry, comprising a chain belt conveyor provided with a drive device according to the invention.
Figure 2:
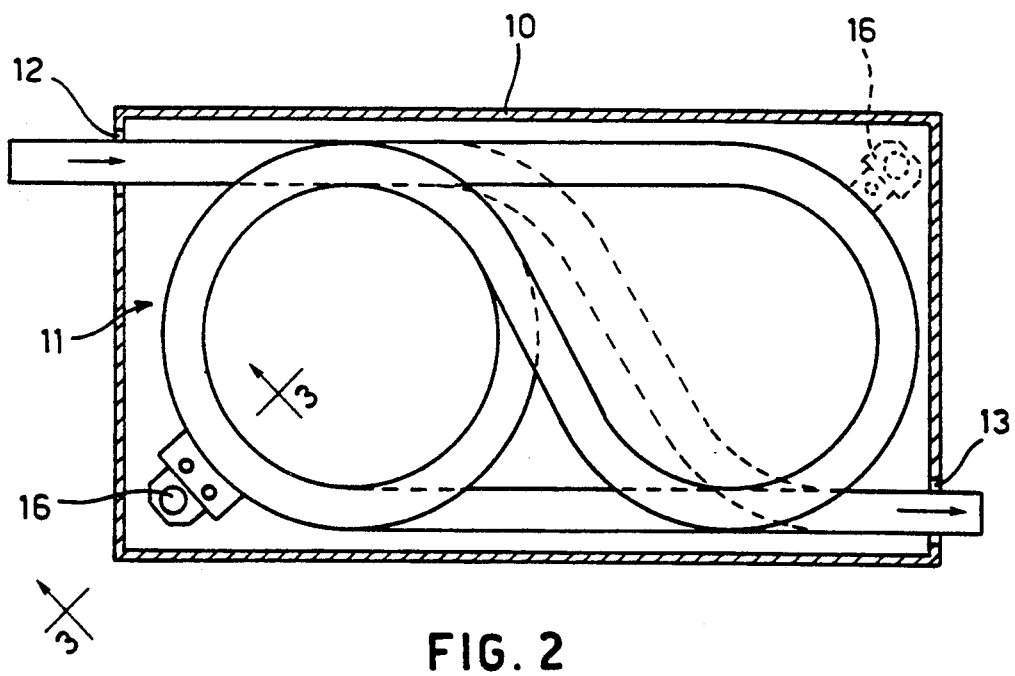
FIG. 2 is a sectioned plan view of the leavening chamber shown in FIG. 1.

FIGS. 1 and 2 of the drawings show a generic type of freezing chamber 10 comprising a chain conveyor 11 in which a conveyor belt extends in multiple turns from a product inlet point 12 to an outlet 13 arranged substantially at the same level or at a different level. The belt of the conveyor therefore extends in superimposed turns 14 and 15 belonging alternately to the ascending and descending path of the conveyor, respectively. Moreover, 16 in FIG. 2 denotes schematically two belt drive units arranged at the corners of the chamber 10.

As schematically shown in the drawings, for example in FIGS. 3, 5, 6, 7 and 8, the conveyor belt consists substantially of two link chains 18 and 19, arranged laterally and at a distance from each other, in which the links of one chain are connected to corresponding links of the other chain by means of a plurality of cross bars 20 which are suitably welded or connected to the chains as explained further below. Each chain 18, 19 of the conveyor belt slides inside longitudinal guides 21, 22 formed with suitable channels 23, 24 along which the horizontal links and vertical links, respectively, of the chains slide.

As schematically shown in FIGS. 3 to 6, in the case of the multiple turns conveyor 11 according to FIG. 1, each drive unit 16 comprises substantially a gear motor 25 which, by means of a pinion 26, a chain transmission 27 or other suitable means and the toothed wheels 28 and 29, causes the rotation in opposite directions or otherwise of two shafts 30 and 31, respectively, arranged parallel and vertically on the outer side of the conveyor.

In the region of each turn 14 or 15 of the conveyor, each drive shaft 30, 31 has a pinion 34 and 35, respectively, which meshes with a corresponding gear 36 and 37 rotatably mounted on a cross frame member 38 which joins the two guides 21 and 22 of the conveyor.

Each gear 36 and 37 in turn is rotably connected to a respective toothed wheel 39 for driving the conveyor belt, said wheel having teeth suitably shaped and spaced so as to engage with the links of a lateral chain 18 or 19 of the said conveyor belt.

More precisely, as shown in FIGS. 3, 5 and 6, each toothed wheel 39 for driving the belt is horizontally or parallely arranged to the plane of the same belt, between the two lateral chains 18 and 19, underneath the cross bars 20, thus remaining in the plane of the guides 21, 22, a short distance from the belt.

The arrangement of the driving wheel 39, parallel to the belt, is extremely advantageous for many reasons. First of all, this arrangement of the driving wheel reduces to a mininum the height dimensions of the drive device underneath the conveyor belt compared to the arrangement of conventional driving wheels; this enables, for example, the individual turns in a multiple turns conveyor to be disposed closer together, with a consequent reduction in the overall dimensions, namely in the volume of the freezing chamber, with a relevant reduction in the energy required to keep this conditioned environment at the required temperature; namely, for the same dimensions and volume of the entire conveyor, it is possible to obtain longer conveying paths.

The arrangement of the driving wheel 39, parallel to the plane of the belt, also enables the continuous up-down displacements of the chains of the belt in conventional drive systems to be eliminated, with the consequent absence of vibrations, less noise, less friction and less loss of power. Furthermore, since the driving wheel can be dimensioned with a comparatively larger diameter, in addition to obtaining higher speeds, greater regularity of movement is also achieved since it is possible to have two or more teeth simultaneously engaged with the chain, thus avoiding sudden, jerky or irregular effects in the drive movement.

The arrangement of the driving wheel 39, horizontal or parallel to the belt, may be used indifferently both in curved sections, as for example shown in FIGS. 2 to 7, and in straight sections, as shown in FIG. 8; in this latter case, two drive units 16 may be arranged opposite each other, as schematically shown in the figure, each being actuated by its own motor, namely the two driving wheels arranged opposite each other may be connected by a suitable transmission to a single drive motor. In all cases the design of the drive unit 26 is greatly simplified, and the said unit can be easily accessed from outside the conveyor for normal repair or maintenance operations. Furthermore, the possibility of arranging the driving unit 26 at any point on the curve enables it to be located at the corner of the chamber 10, the walls of which may be moved closer to the said conveyor, with a consequent further reduction in the volumes of the chamber itself.

As previously mentioned, the main characteristic features of the drive device according to the invention consist in the great compactness, in its extremely simple design and in the regularity of movement which it ensures.

However, the arrangement of the driving wheel horizontal or coplanar with respect to the two chains of the conveyor belt results in further advantages and features. All this is shown more clearly in FIGS. 9 and 10 of the accompanying drawings.

Since the toothed or driving wheel 39 engages on the inner side of the chain, as hown in FIG. 6, unlike conventional systems, it is no longer required to interrupt the continuity of guide to allow the toothed wheel to engage with the chain of the belt: according to the present invention, the chain guide channels are therefore continuous along the entire length of the conveyor with the consequent advantages as regards sliding and regular movement of the belt.

Furthermore, since the entrainment forces exerted by the toothed wheel 39 no longer have a component perpendicular to the conveyor belt and no longer cause repeated raising and lowering movements of the belt, the causes of the vibrations are totally eliminated, along with the use of opposing guide rails, with a consequent reduction in the friction and noise level.

The arrangement of the driving wheel 39 parallel to and underlying the plane of the belt, the continuity of the chain guide channels, and the total absence of opposing guide rails normally required to prevent the vertical movement of the chains in the region of conventional drive units, also enable the cross bars 20 to be positioned above the guides; thus it is now possible for the bars 20 to be arranged such that they project laterally beyond the chains and the guides themselves, on one or both sides of the conveyor belt, with the consequent advantages described further below.

Figure 9:
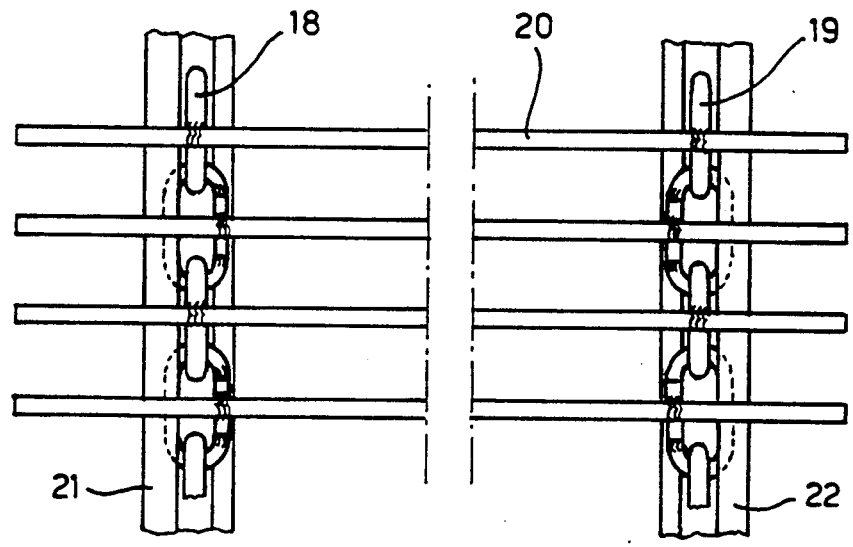
FIGS. 9, 10 and 11 show respectively a plan view, a cross-sectional view and a longitudinally sectional view of a chain conveyor, intended to illustrate further characteristic features which can be achieved in a chain conveyor according to the invention.
Figure 10:
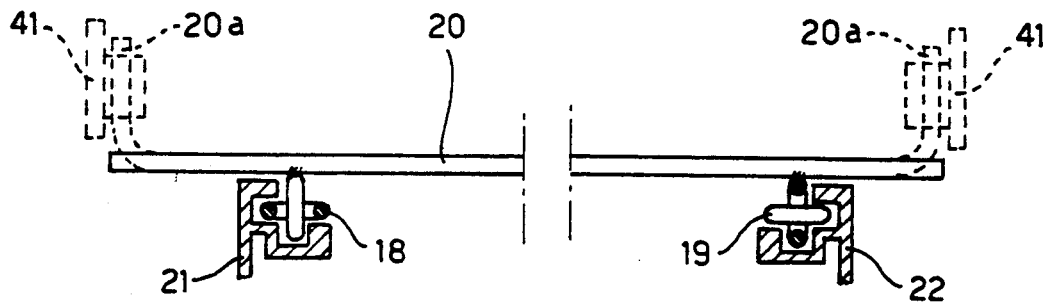

This possibility of lateral projection of the bars 20 beyond the guides 21 and 22 is clearly shown both in FIG. 6 and in FIGS. 9 and 10 of the accompanying drawings.

According to the present invention, it is therefore possible to extend the bars 20 on one or both sides of the conveyor belt, beyond the guides 21 and 22, thus giving rise to the possibility of varying and adapting the width of the belt according to specific needs, keeping unvaried the space between the chains 18 and 19 or freely varying this distance independently of the length of the bars 20 and hence the width of the belt, and the radii of curvature of the path followed.

Figure 11:
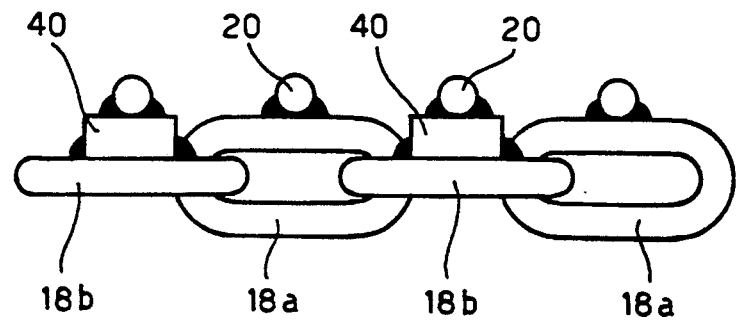

In order to keep the bars 20 above the guides and in a same plane, as shown in FIG. 10, the bars 20 are welded directly onto the upper side of each vertical link of the chain, for example as shown for the links 18a in FIG. 11, while the bars 20 are welded to the horizontal links 18b by means of spacers 40. This enables the entire conveyor to be designed with greater freedom since the width of the belt is totally independent of the distance between the chains and hence the radius of curvature of the outer chain of the conveyor belt. In fact, in conventional conveyors, the minimum radius of curvature permitted for the outer chain of the conveyor belt is equivalent to about 3.5 times the width of the belt itself, or the distance between the two chains. The ratio $K = R/L$, where $R =$ the radius of curvature of the outer chain of the belt and $L =$ the width of the belt, is extremely binding and cannot be reduced below the abovementioned value of $K = 3.5$ for the outer radius and $K = 2.5$ for the inner radius.

According to the present invention, however, the ratio $K = R/L$ may be chosen as required and considerably less than the abovementioned value, since the length of the bars 20, or width of the belt, and distance between the chains 18 and 19 are no longer dependent on each other; for example, the value K may be reduced to about 1.5 or 1.2. Therefore, while keeping the width of the belt, i.e. the length of the cross bars 20, unvaried, it is possible to adapt the distance between the chains according to specific applicational requirements.

FIG. 10 of the accompanying drawing shows a further feature which is possible in a chain conveyor incorporating a drive device according to the invention.

In fact, since there is no longer any danger of interference between the cross bars 20 and the guides 21 and 22 of the conveyor belt, it is possible to fold upwards, or at the desired inclination, one or both the ends of the bars 20, as indicated by 20a in FIG. 10; this results in the possibility of forming lateral shoulders or walls for retaining the product, which move together with the belt itself, unlike conventional conveying systems where the walls are rigidly fixed to the guides or to the supporting structure of the belt. The possibility of particularly delicate products being damaged by rubbing or knocking against the fixed retaining walls is thus avoided.

In addition to lateral retention of the material being conveyed, upward folding of the ends of the cross bars 20 also enables a process of thermal exchange to take place with the exterior by allowing an adequate air flow; this may be extremely advantageous for example in the case where the product must be cooled in a chamber or in the transportation environment itself. In place of or in combination with upward folding of the ends 20a of the bars, it is possible to envisage the use of removable and tiltable fins 41 which are suitably fixed, for example inserted onto the folded ends 20a of the bars, so as to provide practically continuous or suitably shaped lateral protection walls on one or on both sides, which nevertheless moves together with the conveyor belt.

Both in the case of a multiple turns conveyor and a curved section, at each curve there is inserted, at a point where the guides are briefly interrupted, an elastic tension compensation device, such as a gas spring or the like, which compensates belt design errors, thermal expansion and any length variations of the entire conveyor.

From the above description and accompanying drawings it can thus be seen that a chain conveyor has been provided, which is characterised by a new drive system which envisages the arrangement of the toothed entrainment wheels, parallel to the belt, in an intermediate position between the lateral chains of the belt itself, underneath and at a short distance from the cross bars connecting the chains. It is therefore understood that the description and illustrations have been provided purely by way of an example of the idea of the general solution of the present invention.

What is claimed is:

1. Chain conveyor of the type comprising a chain belt having a first and second link chains (18, 19) slidable within guides (21, 22), in which the link elements of a chain (18) are connected to corresponding link elements of the other chain (19) by cross bars (20), and in which there is provided at least one drive unit (16) for the conveyor belt, said drive unit (16) comprising at least one toothed wheel (39) which engages with the links of one of the chains (18, 19), said toothed wheel (39) being arranged parallel to and between the chains (18, 19) of the conveyor belt, in a position underneath the cross bars (20) connecting said chains (18, 19).

2. Chain conveyor according to claim 1, in which the diameter of said toothed wheel (39), in relation to the longitudinal dimensions of the link elements of the chains (18, 19), is such as to have two or more teeth of the same wheel (39) simultaneously in engagement with corresponding links of the chain (18, 19).

3. Chain conveyor according to claim 1, in particular of the type comprising a multiple turns arrangement, in which the descending turns (15) of the belt are located between ascending turns (14), said driving unit (16) comprising a toothed driving wheel (39) for each ascending turn (14) and a toothed driving wheel (39) for each descending turn (15) of the conveyor belt, said driving wheels (39) of the ascending turns (14) and the driving wheels (39) of the descending turns (15), respectively, being connected via respective common drive shafts (30, 31) and a single transmission system (26, 27, 28, 29) to a single drive motor (25).

4. Chain conveyor according to claim 1, in which said cross bars (20) of the conveyor belt are welded to the links of the chains (18, 19) in a plane lying above the chains (18, 19) and said guides (21, 22).

5. Chain conveyor according to claim 4, in which said cross bars (20) extend beyond the chains (18, 19) and above the guides (21, 22), on at least one side of the conveyor belt.

6. Chain conveyor according to claim 5, in which at least one end (20a) of the bars (20) which extends beyond the respective chain (18, 19) of the belt is upwardly folded 7. Chain conveyor according to claim 1, in which at least one end of the cross bars (20) of the belt there is provided with lateral fins (41) for retaining the product being conveyed.

8. Chain conveyor according to claim 7, in which said lateral fins (41) are removably fixed to one upturned end (20a) of the cross bars of the conveyor belt.

9. Chain conveyor according to claim 4, in which said cross bars (20) of the conveyor belt are fixed to the upper side of the links (18a, 18b) of the chains (18, 19), directly or by a spacer (40).

10. Chain conveyor according to claim 1, in which an elastic tensioning member is disposed, in a curved section or in each curved section of the conveyor, between opposing ends of lateral guides, at a point where said lateral guides (21, 22) are cut.

* * * * *